(12) United States Patent
Wodrich et al.

(10) Patent No.: US 10,677,894 B2
(45) Date of Patent: Jun. 9, 2020

(54) VEHICLE SENSING SYSTEM FOR CLASSIFICATION OF VEHICLE MODEL

(71) Applicant: MAGNA ELECTRONICS INC., Auburn Hills, MI (US)

(72) Inventors: Helmut A. Wodrich, Clarkston, MI (US); Walter G. Woodington, Lincoln, MA (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 212 days.

(21) Appl. No.: 15/695,379

(22) Filed: Sep. 5, 2017

(65) Prior Publication Data

US 2018/0067194 A1    Mar. 8, 2018

Related U.S. Application Data

(60) Provisional application No. 62/383,791, filed on Sep. 6, 2016.

(51) Int. Cl.
   *G01S 7/41*      (2006.01)
   *G01S 13/86*     (2006.01)
   *G01S 13/931*    (2020.01)

(52) U.S. Cl.
   CPC ........... *G01S 7/412* (2013.01); *G01S 13/867* (2013.01); *G01S 13/931* (2013.01); *G01S 2013/9314* (2013.01); *G01S 2013/9316* (2020.01); *G01S 2013/9322* (2020.01); *G01S 2013/93271* (2020.01); *G01S 2013/93275* (2020.01)

(58) Field of Classification Search
   CPC .......... G01S 13/867; G01S 13/931; G01S 2013/9314; G01S 2013/9357; G01S 2013/936; G01S 2013/9375; G01S 2013/9389; G01S 7/412
   USPC ......................................... 342/52
   See application file for complete search history.

(56) References Cited

U.S. PATENT DOCUMENTS

| | | | |
|---|---|---|---|
| 5,949,331 A | 9/1999 | Schofield et al. | |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,825,455 B1 | 11/2004 | Schwarte | |

(Continued)

FOREIGN PATENT DOCUMENTS

| WO | 2011090484 A1 | 7/2011 |
|---|---|---|
| WO | 2018007995 A1 | 1/2018 |

*Primary Examiner* — Timothy X Pham
(74) *Attorney, Agent, or Firm* — Honigman LLP

(57) ABSTRACT

A sensing system for a vehicle includes at least one radar sensor disposed at the vehicle and having a field of sensing exterior of the vehicle. The at least one radar sensor includes an antenna array having multiple transmitting antennas and multiple receiving antennas. Sensed radar data provides a data set of radar reflection responses for an object in the field of sensing of the at least one radar sensor, and the data set of radar reflection responses is compared to stored data sets representative of particular vehicle types. Responsive to the data set of radar reflection responses being determined to correspond to a stored data set, the sensing system classifies the detected object as that particular vehicle type.

29 Claims, 3 Drawing Sheets

(56) References Cited

U.S. PATENT DOCUMENTS

| | | |
|---|---|---|
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 2009/0251335 A1* | 10/2009 | Moon ............... G08G 1/015 340/933 |
| 2010/0001897 A1 | 1/2010 | Lyman |
| 2010/0245066 A1 | 9/2010 | Sarioglu et al. |
| 2010/0296703 A1* | 11/2010 | Marti ............... G06K 9/00697 382/103 |
| 2012/0062743 A1 | 3/2012 | Lynam et al. |
| 2012/0218412 A1 | 8/2012 | Dellantoni et al. |
| 2013/0215271 A1 | 8/2013 | Lu |
| 2013/0222592 A1 | 8/2013 | Gieseke |
| 2014/0176679 A1* | 6/2014 | Lehning ............ G06K 9/00208 348/46 |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0003935 A1* | 1/2016 | Stainvas Olshansky ................... G01S 7/415 342/70 |
| 2016/0036917 A1 | 2/2016 | Koravadi et al. |
| 2016/0054441 A1* | 2/2016 | Kuo ................ G01S 13/931 342/73 |
| 2016/0140393 A1* | 5/2016 | Schneider ......... G06K 9/00671 382/103 |
| 2016/0210853 A1 | 7/2016 | Koravadi |
| 2017/0120904 A1* | 5/2017 | Kentley ............. G01C 21/32 |
| 2017/0129489 A1 | 5/2017 | Pawlicki et al. |
| 2017/0168156 A1* | 6/2017 | Hoare ............... G01S 7/024 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0307733 A1* | 10/2017 | Stainvas Olshansky ................... G01S 13/87 |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0105176 A1 | 4/2018 | Pawlicki et al. |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0217775 A1 | 7/2019 | May et al. |

* cited by examiner

VEHICLE SENSING SYSTEM FOR CLASSIFICATION OF VEHICLE MODEL

CROSS REFERENCE TO RELATED APPLICATION

The present application claims the filing benefits of U.S. provisional application Ser. No. 62/383,791, filed Sep. 6, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle to sense a respective region exterior of the vehicle, with the sensor system comprising at least one radar sensor disposed at the equipped vehicle (equipped with the system and sensor(s) of the present invention) and having a field of sensing exterior of the vehicle. The at least one radar sensor comprises multiple Tx (transmitters) and Rx (receivers) on an antenna array, so as to provide high definition, fine resolution in azimuth and/or elevation to determine high definition Radar Reflection Responses for objects detected by the system. The system generates a data set of radar reflection responses for an object in the field of sensing of said at least one radar sensor, and compares the data set to stored data sets representative of particular vehicles. Responsive to the data set of radar reflection responses being determined to correspond to a stored data sent, the sensing system classifies the detected object as that particular vehicle (model or type or the like).

These and other objects, advantages, purposes and features of the present invention will become apparent upon review of the following specification in conjunction with the drawings.

DESCRIPTION OF THE PREFERRED EMBODIMENTS

Figure 1:
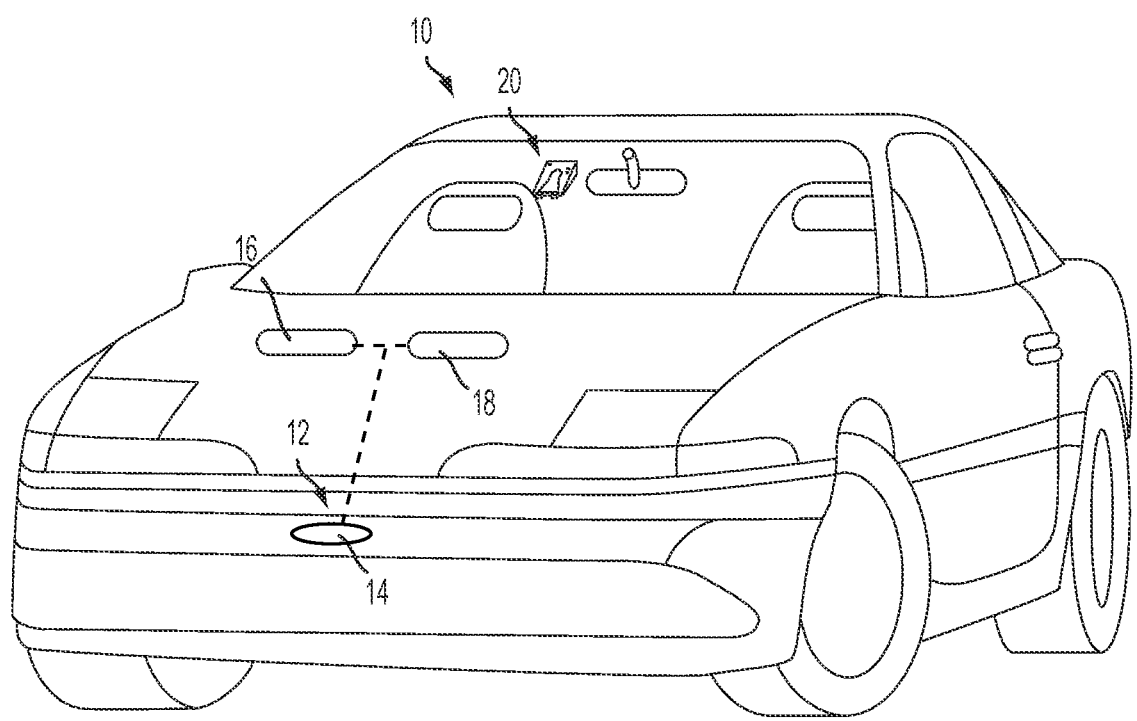
FIG. 1 is a perspective view of a vehicle with a sensing system that incorporates a radar sensor in accordance with the present invention.

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors 20, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) 16 or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

Forward Collision Warning (FCW) systems and other Advanced Driving Assistance Systems (ADAS) include radar sensors, typically mounted in the grill or front bumper (such as shown in FIG. 1) and machine vision systems, with a camera mounted at and behind the windshield of the vehicle and viewing through the windshield and forward of the vehicle. The radar sensors used for forward sensing include planar antenna arrays designed to gather ranging and velocity information. In some instances, a single planar radar is co-located with a machine vision system (and optionally utilizing aspects of the sensing systems described in U.S. patent application Ser. No. 15/685,123, filed Aug. 24, 2017, and published on Mar. 1, 2018 as U.S. Patent Publication No. US-2018-0059236, which is hereby incorporated herein by reference in its entirety).

The vision systems utilize object recognition methods to identify objects such as lane markings, edges of vehicles, taillights, road signs, and/or the like, to support forward collision mitigation systems, wherein the objects identified by range and velocity within the radar are clustered and smoothed over multiple scan cycles to determine vectors for the track of a vehicle. Combined with tracked objects from the machine vision system, decisions are made to support autonomous actions by the equipped vehicle, such as steering of the equipped vehicle and/or braking or decelerating of the equipped vehicle, to prevent or reduce the potential impact of a collision or provide automated cruise control.

The radar sensors used typically have been limited to provide only radar track, position and velocity information, and have been unable to identify the vehicle attributes such as type or specifics such as make or model. Such early identification of vehicle attributes would be beneficial information for confirmation with machine vision system, aiding in decision making in safety applications. For both systems, the FOV of the sensor controls what can be seen, and at what location relative to the source or equipped vehicle. For radar systems, this is further effected by the effective range and angular resolution of the radar, controlled respectively by the available signal bandwidth and the beam shape defined by the antenna design.

In accordance with the present invention, High Definition (HD) radar sensor(s) are disposed at or positioned on a vehicle to provide range, velocity, and angular information in horizontal and/or vertical fields of view (FOV). Use of sensors with high angular and range resolution distinguishes multiple radar reflection responses from the surfaces of a detected object or vehicle, such as the rear bumper, taillights, tailpipes, axles and suspension, wheels, wheel wells and the like of the detected vehicle. Each Radar Reflection Response (R3) also includes measures of the strength of the returned signal associated with the range, velocity and position information. For any given detected vehicle type or model, this response is unique and changes with the viewing angle relative to the observation point, range and relative velocity.

Data or images representative of different vehicles' Radar Reflection Response (R3) are used to build a classification library, which can be referenced to correlate response reflections with the known parameters of various types, makes, models and configurations to determine and assign vehicle type information to objects sensed by the system. Additional information gathered from a machine vision system may be available. By merging the classification data, signature, aspect and track information with machine vision data, the merged information permits improved decision making with higher reliability.

Integration of machine vision object data with ranging, classification and aspect information within a microprocessor system capable of deep learning algorithms provides an alternate means of improvement in the reliability of the system's decision making capability. Additionally, individual vehicle identifiers (such as, for example, taillights, vehicle height, and/or the like) contained within the complete Radar Reflection Response image, are available to be fused with similar vehicle attribute data gathered by other sensors (radar, ultrasonic, camera, LIDAR, and/or the like) permitting increased reliability for decision making.

Figure 2:
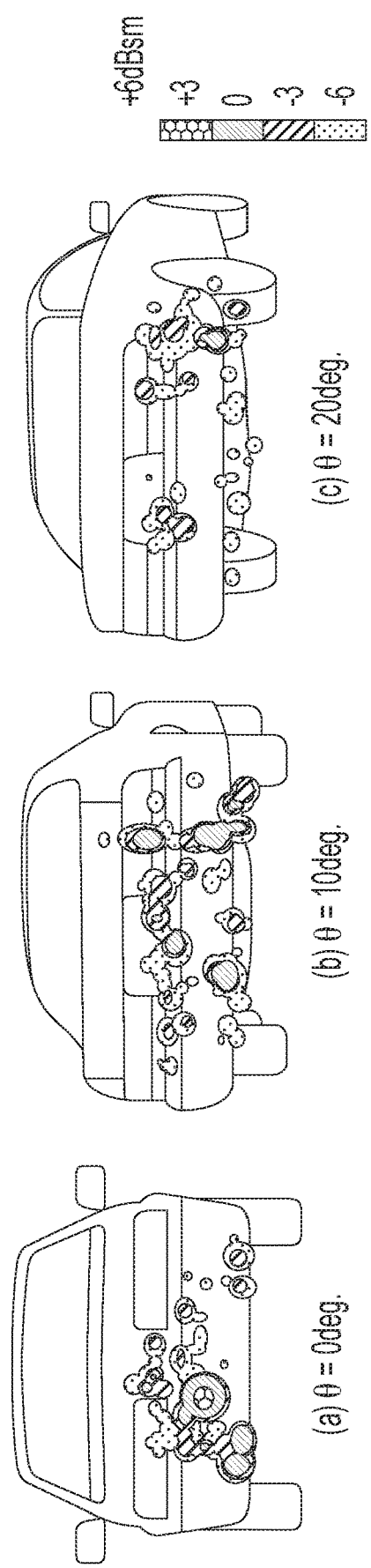
FIG. 2 are images showing the effect of aspect angle on the Radar Reflection Response (R3) of a vehicle.

In accordance with the present invention, individual sensors are positioned on a vehicle. For each location of individual sensors or for combinations of sensors, the Radar Reflection Responses of specific vehicle makes and models are measured to establish the characteristic signature for the particular vehicle (such as shown in FIG. 2).

Figure 3:
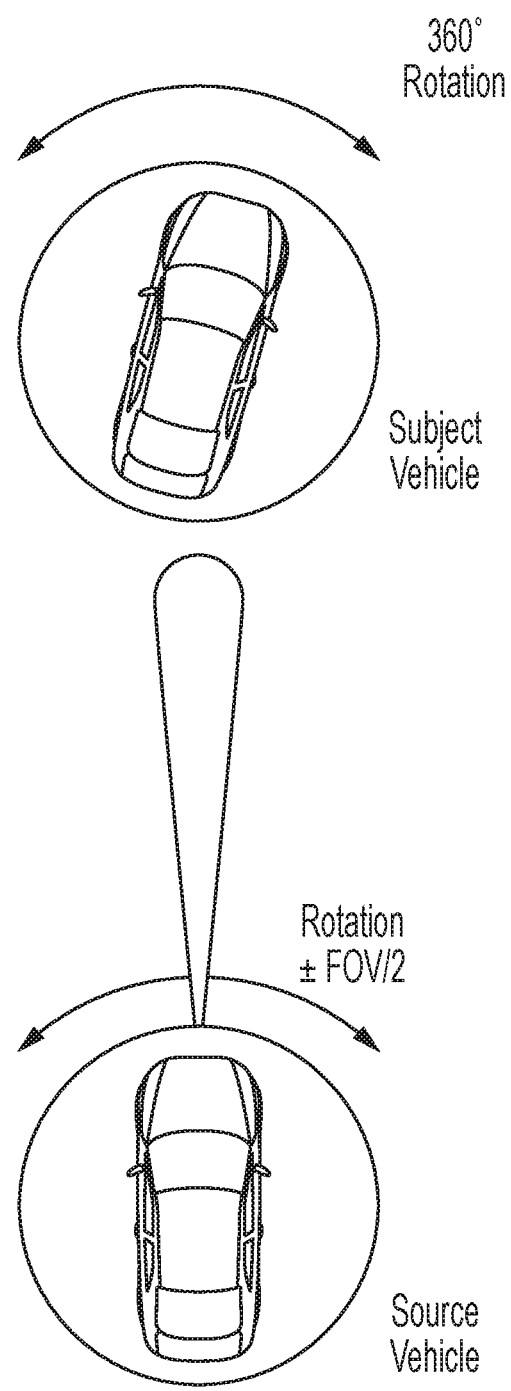
FIG. 3 is a top plan view of a vehicle equipped with the sensing system of the present invention, showing the system or method of the present invention, where the equipped vehicle (and associated radar system) is rotated within its field of view range while a particular vehicle type or model is rotated 360 degrees, in order to collect a data set representative of the particular vehicle type or model.

In order to establish the signature for individual vehicles, the following method is envisioned (and shown in FIG. 3):
The particular vehicle to be measured or classified or characterized is placed on a rotary table permitting 360 degree rotation (see "Subject Vehicle" in FIG. 3).
An HD radar source, located in vehicle position on an equipped vehicle (see "Source Vehicle" in FIG. 3), is positioned on a rotary table permitting translation of the detected other vehicle through the entire breadth of the sensor's field of sensing or field of view (FOV).
The radar's RF receive signal permits a variable delay (t=±xx.xx nanoseconds) and a corresponding reduction in signal strength is input on the reflected signals reception in the sensor to simulate the other vehicle at a range greater or less than the actual distance between the sensor (of the equipped/source vehicle) and other/subject vehicle.

Using this arrangement (see FIG. 3), data is collected as the source/equipped vehicle is rotated or swept through its range or field of view while the particular vehicle being characterized is within the field of sensing of the sensor and is rotated 360 degrees. The Radar Reflection Response (R3) of the particular vehicle can be measured at a fixed range by rotating the particular vehicle's rotary table. Combining motion of the equipped vehicle's rotary table in closed loop control with the particular vehicle's rotary table permits the measurement of Radar Reflection Response (R3) relative to the aspect of the particular vehicle and its bearing. With the addition of the time delay and signal magnitude compensation into the closed loop control, the method can gather radar reflection response data representing a full range of positions of the other vehicle in azimuth, range and intersection angle along a particular vehicle path.

Additional methods incorporating scanning the exterior of the other vehicle, while varying range to the vehicle, the speed and angle of approach/departure relative to the vehicle, are envisioned as potential means of establishing and/or validating vehicle specific Radar Reflection Response (R3) signatures.

Within the signal processing and analysis software (SW) of the radar sensor, or contained in a secondary microprocessor on the vehicle or external to the vehicle, such as a cloud type service, attributes associated with an unknown target detected by the radar sensor(s) on the equipped vehicle are classified using a correlation methodology to define the object/vehicle type (such as a sedan, coupe, pickup truck, SUV, van, commercial truck, semi-truck, and/or the like).

Therefore, the present invention provides a system including one or more radar sensors collecting high definition location information (such as range, elevation angle, azimuth angle) and velocity of objects within the field of view, and grouping the data into clusters or data sets to define the object or vehicle. The collected data set is associated with or compared to established motion paths of objects (such as stored motion paths for various types of vehicles) in the field of view of the sensor(s). Responsive to a determined correlation of the data set with an established motion path of a particular type of vehicle, the data set is assigned or classified as being representative of a potential vehicle in the field of view of the sensor(s).

The system includes stored data sets 18 that are representative of different vehicle types or models. The stored data sets may be collected via rotating a particular vehicle type or model within the field of sensing of a sensor at an equipped vehicle (while also rotating the equipped vehicle and sensor so that the particular vehicle is viewed at various angles relative to the principal sensing axis of the radar sensor of the equipped vehicle). For example, the particular vehicle may be rotated 360 degrees in front of the equipped vehicle when the equipped vehicle has its principal sensing axis of its radar sensor directed towards the particular vehicle and at various angles to either side of the particular vehicle. The system correlates the collected data of the sensed particular vehicle with the various sensing angles to provide a data set for that particular vehicle that can be accessed to determine if data sensed during operation of the sensing system while the vehicle travels along a road is indicative of that particular sensed vehicle. During such operation of the system and equipped vehicle, the system may access multiple stored data sets, each representative of a path of travel of a particular vehicle type relative to the equipped vehicle, in order to determine which stored data set best matches the collected data set and thus in order to determine if the detected object may be one of the types of vehicles represented by the stored data sets.

The method for establishing the Radar Reflection Response (R3) of a specific vehicle model or type may include rotating a particular vehicle at a controlled angular rate, and rotating an equipped vehicle, including the radar sensor(s), through the full range of the field of view. The method may include delaying the received signal or effective range. A system controller is capable of controlling the motion of the particular vehicle turntable or rotating means, the equipped vehicle turntable and rotating means and the delay time to simulate motion of the particular vehicle to record the Radar Reflection Response signature of a specific vehicle (or vehicle type) and define a known reference signature's attributes for that specific vehicle (or vehicle type).

During operation of the system on an equipped vehicle traveling on a road, the captured data or data set associated with a detected object (potential vehicle) is compared with a library of known signatures or data sets, gathered for various vehicle types (sedan, coupe, pickup truck, SUV, van, commercial truck, semi-truck, and/or the like) to classify the vehicle type of the detected potential vehicle. The known signature attributes are available within the system memory, or via external sources accessed in real time or via periodic updates to the vehicle, or within a deep learning neural network accessible via the system controller.

The system may also include a machine vision system, where information acquired from the machine vision system for a potential vehicle (height, width, taillight location, license plate number, and/or the like) is evaluated to establish a confirmation correlation associated with the potential vehicle radar system data, assigned within a vehicle attribute data record or enhanced object list comprising radar data, machine vision data, correlation data, vehicle type data, and vehicle data.

The system may utilize data from the vehicle attribute data record, and may access data from external to the vehicle, such as IoT cloud data sources, to confirm vehicle classification (license plate => vehicle type, make or model).

The data associated with a potential vehicle is compared with a known signature, gathered for specific vehicles to classify the vehicle make and/or model. The known signature attributes are available within system memory, external sources access real time by the vehicle, or within a deep learning neural network accessible via the system controller.

The sensing system may be capable of providing short range communication between vehicles or infrastructure. For example, the short range communication may comprise a one-way communication (where the sensing system either sends or receives information) or a two way communication (where the sensing system sends and receives information). The information communicated may include at least one of status of driver assist system functions, environment maps, object classification data, position data, intended route, vehicle condition monitoring data, tolling authorization, parking requests, driver monitoring and preferences and ITS infrastructure updates. The information communicated may include radar reflection response (R3) data for objects or targets in the radar sensor's field of sensing. The radar reflection response (R3) data of the host vehicle and one or more vehicles radar reflection response (R3) data received via communicated information may be combined and evaluated by data analysis software methods to establish enhanced surface responses and classification for objects in the field of sensing of the at least one radar sensor.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484, and/or U.S. Publication Nos. US-2017-0222311 and/or US-2010-0245066, and/or U.S. patent application Ser. No. 15/685,123, filed Aug. 24, 2017, and published on Mar. 1, 2018 as U.S. Patent Publication No. US-2018-0059236, Ser. No. 15/675,919, filed Aug. 14, 2017, and published on Jan. 8, 2020 as U.S. Patent Publication No. US-2018-0045812, Ser. No. 15/647,339, filed Jul. 12, 2017, now U.S. Pat. No. 10,239,562, Ser. No. 15/619,627, filed Jun. 12, 2017, and published on Dec. 14, 2017 as U.S. Patent Publication No. US-2017-0356994, Ser. No. 15/584,265, filed May 2, 2017, Now U.S. Pat. No. 10,534,081, Ser. No. 15/467,247, filed Mar. 23, 2017, now U.S. Pat. No. 10,571,562, and/or Ser. No. 15/446,220, filed Mar. 1, 2017, published on Sep. 7, 2017 as U.S. Patent Publicaiton No. US-2017-0254873, and/or International PCT Application No. PCT/IB2017/054120, filed Jul. 7, 2017, which published on Jan. 11, 2018 as PCT Publication No WO 2018/007995, and/or U.S. provisional application Ser. No. 62/383,790, filed Sep. 6, 2016, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2x or V2x or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
    at least one radar sensor disposed at a vehicle equipped with said sensing system and having a field of sensing exterior of the equipped vehicle;

wherein said at least one radar sensor comprises an antenna array having multiple transmitting antennas and multiple receiving antennas, wherein said transmitting antennas transmit signals and said receiving antennas receive the signals reflected off objects;

a control, wherein radar data sensed by said at least one radar sensor is received at said control, and wherein said control, responsive to received sensed radar data, detects an object in the field of sensing of said at least one radar sensor;

wherein a data set of received sensed radar data that is representative of an object in the field of sensing of said at least one radar sensor is compared to stored data sets representative of particular vehicle types, and wherein, responsive to the data set of received sensed radar data being determined to correspond to a stored data set of the stored data sets, said sensing system classifies the detected object as that particular vehicle type; and wherein the stored data sets are generated via data collection of particular vehicle types that are rotated within a field of sensing of at least one testing radar sensor.

2. The sensing system of claim 1, wherein the received sensed radar data comprises high definition radar reflection responses.

3. The sensing system of claim 2, wherein the high definition radar reflection responses are evaluated by data analysis software methods to establish surface responses for objects in the field of sensing of said at least one radar sensor.

4. The sensing system of claim 1, wherein the received sensed radar data comprises a data set of radar reflection responses for the detected object, and wherein the data set of radar reflection responses for the detected object is compared with the stored data sets, which comprise a library of known signatures, gathered for vehicle types to classify the vehicle type of the detected object.

5. The sensing system of claim 4, wherein the known signature attributes are available via one of (i) system memory, (ii) an external source, and (iii) a deep learning neural network accessible via a system controller.

6. The sensing system of claim 1, wherein the equipped vehicle includes a vision system comprising at least one exterior viewing camera disposed at the equipped vehicle and an image processor for processing image data captured by the at least one exterior viewing camera, wherein information is shared between said sensing system and the vision system.

7. The sensing system of claim 6, wherein image data acquired from the vision system for a potential vehicle is processed to establish a confirmation correlation associated with a data set of received sensed radar data for the detected object or potential vehicle.

8. The sensing system of claim 1, wherein said sensing system accesses data form external to the equipped vehicle, such as Internet of Things (IoT) cloud data sources, to confirm vehicle classification of the detected object.

9. The sensing system of claim 1, wherein the received sensed radar data associated with a potential vehicle is compared with a known signature gathered for specific vehicle types to classify the vehicle type and/or model.

10. The sensing system of claim 1, wherein said sensing system comprises two or more individual radar sensors, each having an antenna array having multiple transmitting antennas and multiple receiving antennas, and wherein said two or more individual radar sensors are spaced at a known separation and aligned within a known attitude, and wherein information is shared between the individual radar sensors operating in stereo to determine high definition radar reflection responses for objects detected by said sensing system.

11. The sensing system of claim 1, wherein said at least one radar sensor is disposed at a front portion of the equipped vehicle and senses forward of the equipped vehicle.

12. The sensing system of claim 1, wherein said at least one radar sensor is disposed at a rear portion of the equipped vehicle and senses rearward of the equipped vehicle.

13. The sensing system of claim 1, wherein said at least one radar sensor is disposed at a side portion of the equipped vehicle and senses sideward of the equipped vehicle.

14. The sensing system of claim 1, wherein said at least one radar sensor is part of a sensing system capable of providing at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain mapping, (x) collision mitigation and (xi) intersection collision mitigation.

15. The sensing system of claim 1, wherein said sensing system is capable of providing short range communication with a system of another vehicle or an infrastructure system.

16. The sensing system of claim 15, wherein the short range communication comprises a one-way communication or a two way communication.

17. The sensing system of claim 15, wherein information communicated by said sensing system includes at least one of (i) status of driver assist system functions, (ii) environment maps, (iii) object classification data, (iv) position data, (v) intended route, (vi) vehicle condition monitoring data, (vii) tolling authorization, (viii) parking requests, (ix) driver monitoring, (x) driver preferences and (xi) infrastructure updates.

18. The sensing system of claim 17, wherein the information communicated includes radar reflection response data for objects in the field of sensing of the at least one radar sensor.

19. The sensing system of claim 18, wherein the radar reflection response data of the at least one radar sensor of the equipped vehicle and radar reflection response data of a radar sensor of another vehicle received via communicated information are combined and evaluated by data analysis software methods to establish enhanced surface responses and classification for objects in the field of sensing of said at least one radar sensor of the equipped vehicle.

20. A sensing system for a vehicle, said sensing system comprising:

at least one radar sensor disposed at a vehicle equipped with said sensing system and having a field of sensing exterior of the equipped vehicle;

wherein said at least one radar sensor comprises an antenna array having multiple transmitting antennas and multiple receiving antennas, wherein said transmitting antennas transmit signals and said receiving antennas receive the signals reflected off objects;

a control, wherein radar data sensed by said at least one radar sensor is received at said control, and wherein said control, responsive to received sensed radar data, detects an object in the field of sensing of said at least one radar sensor;

wherein a data set of received sensed radar data that is representative of an object in the field of sensing of said at least one radar sensor is compared to stored data sets representative of particular vehicle types, and wherein, responsive to the data set of received sensed radar data being determined to correspond to a stored data set, said sensing system classifies the detected object as that particular vehicle type; and wherein the stored data sets are established for a specific vehicle type via:

rotating a specific vehicle at a controlled angular rate;

rotating a test vehicle, including at least one testing radar sensor, through the range of a field of sensing of the at least one testing radar sensor;

delaying the received signal or effective range; and wherein a controller is capable of controlling the rotation of the particular vehicle, the rotation of the test vehicle and the delay time to simulate motion of the particular vehicle relative to the test vehicle, and wherein said controller is operable to record a radar reflection response signature of the specific vehicle and define the stored data set having a known reference signature's attributes for that type of vehicle.

21. A sensing system for a vehicle, said sensing system comprising:

at least one radar sensor disposed at a vehicle equipped with said sensing system and having a field of sensing exterior of the equipped vehicle;

wherein said at least one radar sensor comprises an antenna array having multiple transmitting antennas and multiple receiving antennas, wherein said transmitting antennas transmit signals and said receiving antennas receive the signals reflected off objects;

a control, wherein radar data sensed by said at least one radar sensor is received at said control, and wherein said control, responsive to received sensed radar data, detects an object in the field of sensing of said at least one radar sensor;

wherein a data set of received sensed radar data that is representative of an object in the field of sensing of said at least one radar sensor is compared to stored data sets representative of particular vehicle types, and wherein, responsive to the data set of received sensed radar data being determined to correspond to a stored data set of the stored data sets, said sensing system classifies the detected object as that particular vehicle type;

wherein the stored data sets are generated via data collection of particular vehicle types that are rotated within a field of sensing of at least one testing radar sensor;

where the received sensed radar data associated with a potential vehicle is compared with a known signature gathered for specific vehicle types to classify the vehicle type and/or model of the detected object;

wherein the equipped vehicle includes a vision system comprising at least one exterior viewing camera disposed at the equipped vehicle and an image processor for processing image data captured by the at least one exterior viewing camera, wherein information is shared between said sensing system and the vision system; and wherein image data acquired from the vision system for a potential vehicle is processed to establish a confirmation correlation associated with a data set of received sensed radar data for the detected object or potential vehicle.

22. A sensing system for a vehicle, said sensing system comprising:

at least one radar sensor disposed at a vehicle equipped with said sensing system and having a field of sensing exterior of the equipped vehicle;

wherein said at least one radar sensor comprises an antenna array having multiple transmitting antennas and multiple receiving antennas, wherein said transmitting antennas transmit signals and said receiving antennas receive the signals reflected off objects;

a control, wherein radar data sensed by said at least one radar sensor is received at said control, and wherein said control, responsive to received sensed radar data, detects an object in the field of sensing of said at least one radar sensor;

wherein a data set of received sensed radar data that is representative of an object in the field of sensing of said at least one radar sensor is compared to stored data sets representative of particular vehicle types, and wherein, responsive to the data set of received sensed radar data being determined to correspond to a stored data set, said sensing system classifies the detected object as that particular vehicle type;

wherein the received sensed radar data associated with a potential vehicle is compared with a known signature gathered for specific vehicle types to classify the vehicle type and/or model of the detected object;

wherein the equipped vehicle includes a vision system comprising at least one exterior viewing camera disposed at the equipped vehicle and an image processor for processing image data captured by the at least one exterior viewing camera, wherein information is shared between said sensing system and the vision system;

wherein image data acquired from the vision system for a potential vehicle is processed to establish a confirmation correlation associated with a data set of received sensed radar data for the detected object or potential vehicle; and wherein the stored data sets are established for a specific vehicle type via:

rotating a specific vehicle at a controlled angular rate;

rotating a test vehicle, including at least one testing radar sensor, through the range of a field of sensing of the at least one testing radar sensor;

delaying the received signal or effective range; and wherein a controller is capable of controlling the rotation of the particular vehicle, the rotation of the test vehicle and the delay time to simulate motion of the particular vehicle relative to the test vehicle, and wherein said controller is operable to record a radar reflection response signature of the specific vehicle and define the stored data set having a known reference signature's attributes for that type of vehicle.

23. The sensing system of claim 21, wherein the received sensed radar data comprises a data set of radar reflection responses for the detected object, and wherein the data set of radar reflection responses for the detected object is compared with the stored data sets, which comprise a library of known signatures gathered for vehicle types to classify the vehicle type of the detected object.

24. The sensing system of claim 21, wherein said sensing system comprises two or more individual radar sensors, each having an antenna array having multiple transmitting antennas and multiple receiving antennas, and wherein said two or more individual radar sensors are spaced at a known separation and aligned within a known attitude, and wherein information is shared between the individual radar sensors operating in stereo to determine high definition radar reflection responses for objects detected by said sensing system.

25. A sensing system for a vehicle, said sensing system comprising:

at least two radar sensors disposed at a vehicle equipped with said sensing system and having respective fields of sensing exterior of the equipped vehicle;

wherein each of said at least two radar sensors comprises an antenna array having multiple transmitting antennas and multiple receiving antennas, wherein said transmitting antennas transmit signals and said receiving antennas receive the signals reflected off objects;

a control, wherein radar data sensed by said at least two radar sensors are received at said control, and wherein said control, responsive to received sensed radar data, detects an object in the field of sensing of at least one of said at least two radar sensors;

wherein a data set of received sensed radar data that is representative of an object in the field of sensing of at least one of said at least two radar sensors is compared to stored data sets representative of particular vehicle types, and wherein, responsive to the data set of received sensed radar data being determined to correspond to a stored data set of the stored data sets, said sensing system classifies the detected object as that particular vehicle type;

wherein the stored data sets are generated via data collection of particular vehicle types that are rotated within a field of sensing of at least one testing radar sensor;

wherein said sensing system is capable of communicating with a system of another vehicle or an infrastructure system; and wherein the received sensed radar data of at least one radar sensor of the equipped vehicle and sensed radar data of a radar sensor of another vehicle received via communicated information are combined and evaluated to establish enhanced surface responses and classification for objects in the field of sensing of the at least one radar sensor of the equipped vehicle.

26. The sensing system of claim 25, wherein said at least two radar sensors are spaced at a known separation and aligned within a known attitude, and wherein information is shared between the each of the at least two radar sensors operating in stereo to determine high definition radar reflection responses for objects detected by said sensing system.

27. The sensing system of claim 25, wherein information communicated by said sensing system includes at least one of (i) status of driver assist system functions, (ii) environment maps, (iii) object classification data, (iv) position data, (v) intended route, (vi) vehicle condition monitoring data, (vii) tolling authorization, (viii) parking requests, (ix) driver monitoring, (x) driver preferences and (xi) infrastructure updates.

28. The sensing system of claim 25, wherein the information communicated includes radar reflection response data for objects in the field of sensing of the at least one radar sensor.

29. The sensing system of claim 25, wherein the equipped vehicle includes a vision system comprising at least one exterior viewing camera disposed at the equipped vehicle and an image processor for processing image data captured by the at least one exterior viewing camera, wherein information is shared between said sensing system and the vision system, and wherein image data acquired from the vision system for a potential vehicle is processed to establish a confirmation correlation associated with a data set of received sensed radar data for the detected object or potential vehicle.

* * * * *